United States Patent Office 2,836,629
Patented May 27, 1958

2,836,629

METHODS OF PREPARATION OF CYCLOHEXADIENES

Alfred Viola, College Park, Md., Herman Fleischacker, Washington, D. C., Gilbert Forrest Woods, Silver Spring, Md., and Nicholas Charles Bolgiano, Pittsburgh, Pa.

No Drawing. Application March 10, 1955
Serial No. 493,575

10 Claims. (Cl. 260—666)

This invention relates to methods of preparation of cyclohexadienes. More particularly, the invention relates to methods of preparation of cyclohexadienes by the cyclization of conjugated trienes. The invention further relates to the preparation of cyclohexadienes such as methylcyclohexadiene, dimethylcyclohexadiene, phenylcyclohexadiene, and the like.

The aforementioned cyclohexadienes may be readily converted to the corresponding aromatic equivalents, for example, conversion of 1,4-dimethylcyclohexadiene to p-xylene as will be illustrated hereinafter.

The present invention contemplates the cyclization of conjugated trienes such as alkyl-, polyalkyl-, or aryl-hexatrienes to substituted cyclohexadienes at elevated temperatures. The conversion may, however, be facilitated by the use of catalysts.

Alumina, silica, clays and the like are found to be effective catalysts for the aforementioned cyclization.

Cyclization temperatures for optimum yields lie above 300° C. and greatly improved yields are manifested at temperatures in the range of 400° C. and above.

Without intending to limit the scope of the invention thereto, the present invention will be illustrated hereinafter by the following examples:

EXAMPLE I

*The cyclization of 1-phenyl-1,3,5-hexatriene at 350–375°*

1-phenyl-1,3,5-hexatriene (10 g.) was prepared by dehydrating 1-phenyl-1,3-hexadien-5-ol at 275° and was purified by several recrystallizations. The triene (B. P. 100°/.05 mm.) was distilled under nitrogen through an alumina column heated to 350–375°. A portion of the triene polymerized in the distilling flask. The distillate was worked up in the usual manner to yield phenylcyclohexadiene (M. P. 82–4° C.). There was no depression of melting point in a mixed melting point determination with an authentic sample of phenylcyclohexadiene. The ultra-violet absorption curves of both samples were identical.

EXAMPLE II

*Preparation of 1,4-dimethylcyclohexadiene from 2,5-dimethylhexa-1,3,5-triene and conversion of the product to p-xylene*

2,5-dimethylhexa-1,2,5-triene (15 g.) was passed over alumina at a temperature of 475–500° C. under reduced pressure and in a nitrogen atmosphere. The product was condensed in a Dry Ice-acetone bath. After drying, the organic product (11.5 g.) was distilled under reduced pressure (25–50° C./25–35 mm.). The dimethylcyclohexadiene had a typical diene ultraviolet absorption spectrum; $n_D^{30} = 1.472$.

Ten grams of this material was added to 10% palladium-carbon black which was being heated to about 200° C. and under reflux conditions. After the addition, heating under reflux was continued for a further half hour. Distillation of the liquid from the catalyst yielded p-xylene which was recrystallized from petroleum ether.

EXAMPLE III

*Cyclization of 1,2-di-(1-cyclohexenyl)-ethylene and conversion of the product to phenanthrene*

A 200 ml. round-bottom flask was fitted with a reflux condenser, to the top of which a bubble counter was attached. Five grams of 1,2-di-(1-cyclohexenyl)-ethylene and one-tenth gram of 10% palladinized charcoal was placed in the flask and the mixture heated to 350° until the evolution of hydrogen had ceased. At this time the condenser was replaced by a small distilling column and the mixture was distilled, yielding a viscous oil which solidified in the receiver and was recrystallized from ethanol, M. P. 97–99°.

When mixed with an authentic sample of phenanthrene (M. P. 97–101°) there was no depression on melting.

*Analysis.*—Calc'd for $C_{14}H_{10}$: C, 94.34; H, 5.66. Found: C, 94.63; H, 5.83.

This reaction is interesting in that the temperature of reflux, approximately 350° C., is sufficiently high to effect cyclization first to the diene; and the diene is then dehydrogenated to phenanthrene.

In a similar method of treatment, 2,5-dimethyl-1,3,5-hexatriene was added dropwise onto palladium-carbon black and refluxed. Heat was applied by an oil bath whose temperature was 190–200° C. Most of the material polymerized; however, a small amount of p-xylene was obtained.

The argument is that at least two reactions can occur with trienes:

Triene { I polymerization etc.
{ II cyclization to a cyclohexadiene

In relative terms, I is favored by somewhat lower temperatures than are best for II; secondly, reaction II is probably first order (kinetically) while I is probably of some higher order. Therefore, higher temperature and lower concentration (vapor phase) favors II while lower temperature and higher concentration (liquid) favors reaction I. The preparation of phenanthrene as illustrated in this example is thus interesting in that the temperature of reflux is apparently sufficiently high that reaction II is observed to a fair degree.

EXAMPLE IV

*Preparation of methylcyclohexadiene from 1-methyl-1,3,5-hexatriene*

1-methyl-1,3,5-hexatriene was passed through an alumina column as described in Example II. The product, methylcyclohexadiene, was isolated as described in Example II. The boiling point is 24–29° C./20–25 mm. and the refractive index (D) at 30° C. is 1.45–1.47. This substance has a typical diene ultra-violet absorption spectrum, but the spectrum is slightly modified by the superimposition thereon of a spectrum having the typical triple peak of a small amount of triene impurity.

Variations and modifications of materials and conditions may be made in the foregoing examples as will be obvious to those skilled in the art without departing from the scope of the present invention.

It is intended that the patent shall cover by suitable expression in the appended claims the features of patentable novelty which reside in the invention.

We claim:

1. The method of preparation of a cyclohexadiene comprising cyclizing a conjugated triene selected from the group consisting of hexatriene and hydrocarbon substituted hexatrienes at a temperature in excess of 300° C. in the vapor phase.

2. The method of preparation of a cyclohexadiene comprising cyclizing a conjugated triene selected from the group consisting of hexatriene and hydrocarbon substituted hexatrienes at a temperature in excess of 300° C. in the vapor phase in the presence of an inorganic solid catalyst.

3. The method of preparation of a substituted cyclohexadiene comprising cyclizing a substituted conjugated triene selected from the group consisting of hexatriene and hydrocarbon substituted hexatrienes at a temperature in excess of 300° C. in the vapor phase in the presence of an inorganic solid catalyst.

4. The method of preparation of a substituted cyclohexadiene comprising cyclizing 1,2-di-(1-cycloalkenyl)-ethylene at a temperature in excess of 300° C. in the presence of palladinized charcoal.

5. The method of preparation of a substituted cyclohexadiene comprising cyclizing methylhexatriene at a temperature in excess of 300° C. in the presence of an inorganic solid catalyst.

6. The method of preparation of a substituted cyclohexadiene comprising cyclizing dimethylhexatriene at a temperature in excess of 300° C. in the presence of an inorganic solid catalyst.

7. The method of preparation of a substituted cyclohexadiene comprising cyclizing phenylhexatriene at a temperature in excess of 300° C. in the presence of an inorganic solid catalyst.

8. The method of preparation of a substituted cyclohexadiene comprising cyclizing 1,2-di-(1-cyclohexenyl)-ethylene at a temperature in excess of 300° C. in the presence of palladinized charcoal.

9. The method of preparation of a substituted cyclohexadiene comprising cyclizing a hexatriene at a temperature in excess of 300° C. in the vapor phase in the presence of an inorganic solvent catalyst.

10. The method of preparation of a substituted cyclohexadiene comprising cyclizing a substituted hexatriene at a temperature in excess of 300° C. in the vapor phase in the presence of an inorganic solid catalyst.

References Cited in the file of this patent

UNITED STATES PATENTS

| | | |
|---|---|---|
| 2,217,011 | Grosse et al. | Oct. 8, 1940 |
| 2,217,014 | Grosse et al. | Oct. 8, 1940 |
| 2,737,537 | Taylor et al. | Mar. 6, 1956 |

OTHER REFERENCES

Woods et al.: Jour. Amer. Chem. Soc., vol. 77, April 1955, pp. 1800–1803.

Butz et al.: Journal of Organic Chemistry, vol. 5, pp. 171–183 (1939); Jour. Am. Chem. Soc., vol. 64, page 1978 (1942).

Olberg et al.: Jour. Am. Chem. Soc., vol. 66, pages 1096–1099, (1944).